United States Patent
Basnayake et al.

(10) Patent No.: US 9,406,229 B2
(45) Date of Patent: Aug. 2, 2016

(54) TRAVEL LANE ADVISOR

(75) Inventors: Chaminda Basnayake, Windsor (CA); Donald K. Grimm, Utica, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 1984 days.

(21) Appl. No.: 12/616,858

(22) Filed: Nov. 12, 2009

(65) Prior Publication Data

US 2011/0109475 A1    May 12, 2011

(51) Int. Cl.
G08G 1/00 (2006.01)
G08G 1/0967 (2006.01)
G01C 21/36 (2006.01)

(52) U.S. Cl.
CPC ...... *G08G 1/096716* (2013.01); *G01C 21/3658* (2013.01); *G08G 1/096741* (2013.01); *G08G 1/096775* (2013.01); *B60W 2550/402* (2013.01)

(58) Field of Classification Search
CPC .............. G01C 21/3658; G08G 1/096716; G08G 1/096741; G08G 1/096775; G08G 1/20; G08G 1/07; G08G 1/052; G08G 1/164; G08G 1/0104; G08G 1/09675; B60W 2250/402
USPC ......... 340/933, 936, 908, 937, 589, 904, 902, 340/916, 539, 436, 439, 914; 701/117, 701/414.1, 118, 119; 40/606, 607, 612, 544
See application file for complete search history.

(56) References Cited

U.S. PATENT DOCUMENTS

| | | | | |
|---|---|---|---|---|
| 5,164,904 A | * | 11/1992 | Sumner | G08G 1/0104 340/905 |
| 5,396,429 A | * | 3/1995 | Hanchett | G08G 1/0969 340/910 |
| 5,617,086 A | * | 4/1997 | Klashinsky et al. | 340/907 |
| 5,982,298 A | * | 11/1999 | Lappenbusch | G08G 1/0969 340/905 |
| 6,064,318 A | * | 5/2000 | Kirchner et al. | 340/905 |
| 6,204,778 B1 | * | 3/2001 | Bergan et al. | 340/936 |
| 2005/0248469 A1 | * | 11/2005 | DeKock | G08G 1/0104 340/905 |
| 2006/0167617 A1 | | 7/2006 | Krikelis | |
| 2006/0226968 A1 | | 10/2006 | Tengler | |
| 2007/0061065 A2 | * | 3/2007 | Krikelis | 701/117 |
| 2007/0276582 A1 | * | 11/2007 | Coughlin | B60W 40/09 701/123 |
| 2010/0076675 A1 | * | 3/2010 | Barth | G01C 21/3469 701/532 |

FOREIGN PATENT DOCUMENTS

CN    1989704 A    6/2007
CN    101488287 A    7/2009
(Continued)

OTHER PUBLICATIONS

Wikipedia—Artikle "Fundamentaldiagramm des Verkehrsflusses" dated Jul. 24, 2009 http://de.wikipedia.org/w/index.php?title=Fundamentaldiagramm_des_Verkehrsflusses&oldid+62570533.

Primary Examiner — Mirza Alam

(57) ABSTRACT

A traffic flow advisory system includes a locating device for identifying a position of a driven vehicle. A communication device exchanges vehicle position data, speed data, and heading data with remote vehicles. A processor constructs a traffic flow rate in a plurality of road lanes based on the position data and speed data. A human machine interface indicates to a driver of the driven vehicle the traffic flow rate of each of the road lanes.

20 Claims, 4 Drawing Sheets

(56) References Cited

FOREIGN PATENT DOCUMENTS

| DE | 102004024259 A1 | 1/2005 |
| DE | 102004027695 A1 | 11/2005 |
| DE | 102005029662 A1 | 1/2006 |
| DE | 102005039103 A1 | 1/2007 |
| DE | 102006059068 A1 | 6/2008 |

* cited by examiner

TRAVEL LANE ADVISOR

BACKGROUND OF INVENTION

An embodiment relates generally to vehicle-to-vehicle communications.

Navigation devices, such as global positioning devices, display vehicles traveling within a geographical location. Such navigation devices may provide alerts of construction zones and other road warning alerts wirelessly by the navigation device service provider. However, determining which lanes have a slow traffic flow or which lanes are more conducive to a driver's driving behavior is typically determined by the driver of the vehicle monitoring each of the lanes from a visual standpoint and making a best guess as to which lane to choose. Many times the view of the other lanes ahead of the driver is blocked due to an obstruction of vehicles ahead of the driver. Therefore, the driver must make a guess as to whether to switch lanes based on the visual observance by the driver of the vehicle or vehicles directly adjacent to the driver. Often times, a driver switches lanes from a currently driven lane to an adjacent lane that the driver feels is more conducive to his desired rate of traffic flow only to find that the lane the driver has switched to is now traveling at an undesired speed. Under certain situations, such as when a driver is required to take an exit ramp, a driver may be forced to make a lane change in a short period of time with limited information about the surrounding lanes. Some of these conditions may have safety implications, for instance, if a driver is in a fast moving lane and is required to change to a slow moving adjacent lane to take an exit ramp and this speed difference is obstructed by other vehicles, the lane change may contribute to a collision.

SUMMARY OF INVENTION

An advantage of an embodiment of the invention is to provide traffic flow rate awareness to a driver of a vehicle based on global positioning data such as from the Global Positioning system (GPS) and data from remote vehicles such as speed, braking status, hazard lamp or steering activity. The data is communicated wirelessly from the remote vehicles to the host vehicle and lane level traffic flow rates may be constructed from the communicated messages. The lane level traffic flow rates may be presented solely from the wireless communications of remote vehicles or be used to augment digital map database display. Advisory information as to which lane to travel in or speed changes (i.e., slow down or speed up to match the speed of target lane) recommended before changing lanes may be provided to the driver based on the traffic flow rates and predetermined driving parameters.

An embodiment contemplates a traffic flow advisory system that includes a locating device for identifying a position of a driven vehicle. A communication device exchanges vehicle position data, speed data, and heading data with remote vehicles. A processor constructs a traffic flow rate in a plurality of road lanes based on the position data and speed data. A human machine interface indicates to a driver of the driven vehicle the traffic flow rate of each of the road lanes.

An embodiment contemplates a method for advising a driver of a host vehicle of traffic flow rates of the lanes of a traveled road. A position of the host vehicle is determined. Position data, speed data, heading data, and other vehicle sensor data are received from remote vehicles in the traveled road. A traffic flow rate for each of the plurality of road lanes of the traveled road is constructed based on the position of the host vehicle and the position data, speed data, and heading data of the remote vehicles. The driver of the host vehicle is advised of the traffic flow rates for each of the plurality of road lanes of the traveled road.

DETAILED DESCRIPTION

Figure 1:
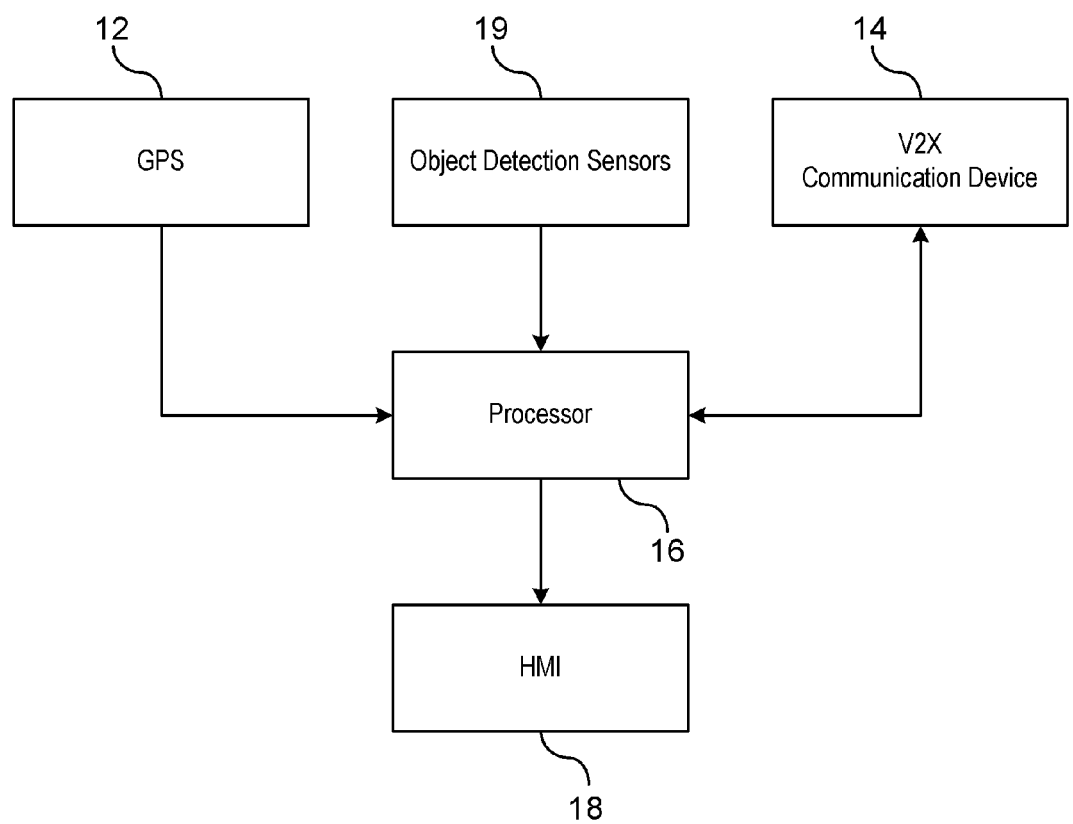
FIG. 1 is a block diagram of a driver advisory system.

There is shown in FIG. 1 a driver advisory system generally shown at 10. The driver advisory system 10 includes a Global Positioning System device 12 (GPS) for establishing a global position of the driven vehicle, which is hereinafter referred to as a host vehicle. GPS is used as an example in this case and any Global Navigation Satellite System (GNSS) or a combination of different GNSS can be used instead. The host vehicle is in communication (which may be either direct communication or indirect communication via multi-hop messaging) with a plurality of remote vehicles that are within a broadcast range of the host vehicle for exchanging global position, speed, and course heading data. Each of the vehicles utilizes a wireless communication device 14. Preferably, the communication device is a device that utilizes a Dedicated Short Range Communication (DSRC) protocol. Alternatively, the device may include, but is not limited to, other types of wireless devices and networks such as cellular phones.

The data received from remote vehicles may be part of a standard periodic beacon message that is broadcast in a vehicle-to-vehicle (V2V) communication system or a V2X communication system (i.e., vehicle to an infrastructure or other type of entity). The wireless message includes data about environmental conditions relating to vehicle positions, vehicle kinematics/dynamic parameters, traffic or road events sensed by respective remote vehicles to forewarn drivers of nearby vehicles of some type of safety condition, traffic delays, accident, or current condition that could result in an accident. Data relating to a GPS determined position of the remote vehicle, the velocity at which the remote vehicle is traveling, and the course heading in which the remote vehicle traveling may be transmitted as part of the periodic beacon message from a remote vehicle.

The driver advisory system 10 further includes a processor 16 for processing the global position data, the velocity data, and the course heading data. This data is extracted from the broadcast message by the processor 16 and is used to determine a traffic flow rate for each lane of a roadway traveled by the host vehicle.

A human machine interface device 18 (HMI) interfaces with the driver of the vehicle for advising the driver of the traffic flow rate for each lane of the road. The HMI 18 may include a display device, an audio device, a haptic device, or a combination of the devices described herein. The display device may include, but is not limited to, a visual display screen such as a navigation display screen or a heads-up-display projected on the windshield. Each of the displays signifies to the driver of the host vehicle the traffic flow rate for each lane of the road. The display may also provide suggestions as to which lane the driver should be traveling in based on a predetermined criteria, which will be discussed in detail later. It should be understood that driver advisory system 10 may be integrated as a single module or may be a plurality of components that cooperatively communicate within one with one another to determine the traffic flow rate and advise the driver accordingly. It should also be understood that each vehicle considers itself a host vehicle and views all other vehicles within its broadcasting range as remote vehicles. Therefore, each vehicle will include a driver advisory system for generating its own traffic flow analysis that is based on information received from other vehicles and advise the driver of the respective vehicle accordingly based on its own driving criteria.

Figure 2:
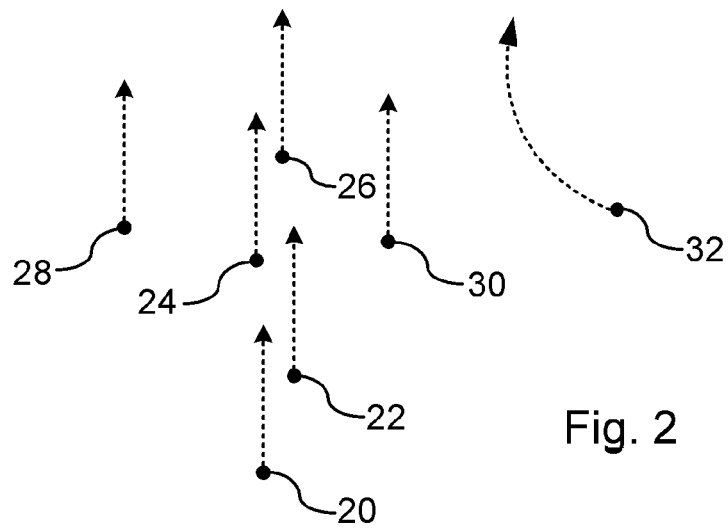
FIG. 2 is a position and velocity vector diagram.

FIG. 2 illustrates a position and velocity vector diagram for each of the vehicles traveling along the roadway. A global position of the host vehicle traveling at a respective speed in a respective direction is shown generally at 20. A global position of each of the remote vehicles traveling in a same direction is shown at 22-30. A remote vehicle merging into the flow of traffic of the roadway with the remote vehicles is shown generally at 32. The position and velocity vector diagram is constructed by obtaining the global position, speed, and course heading data by the GPS device of the host vehicle and the global position, speed, and course heading data that is included in the periodic beacon messages broadcast by the remote vehicles.

Figure 3:
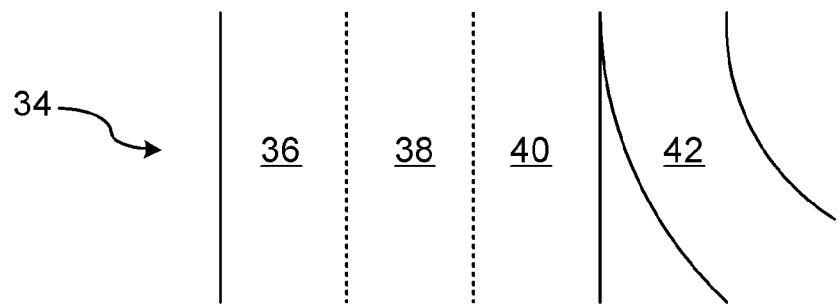
FIG. 3 is a mapping of lanes of a roadway.

FIG. 3 illustrates a mapping of the lanes of a roadway. The roadway 34 includes a left lane 36, a center lane 38, a right lane 40, and a merging lane 42. The roadway 34 may be constructed from map data currently stored in a memory such as a navigation device or may be downloaded from a remote entity such as OnStar™. Alternatively, the roadway 34 may be constructed using the position and velocity vector diagram shown in FIG. 2. To construct the lanes of the roadway using the position and velocity vector diagram, each of the vehicles 20-32 are grouped based on their global position data and heading data. Vehicles traveling in a same course heading within a width-based region are used to establish the respective lanes of travel. For example, referring to FIGS. 2-3, the host vehicle having a global position at 20 and remote vehicles having global positions 22-26 traveling in a same direction within a respective width-based region establishes the center lane 38 of the traveled roadway 34. The remote vehicle 28 is spaced outside of a predetermined width from the other respective vehicles, and therefore, establishes the left lane 36. Similarly, remote 30 is also spaced a predetermined width from the other respective vehicles thereby establishing the right lane 40. Remote vehicle 32 is traveling at a different course heading than the other remote vehicle (i.e., at an angle to the other respective vehicles), and therefore, establishes a merging lane 42. As a result, a diagrammatic map based on data received in broadcast messages by the remote vehicles may be constructed without stored or downloaded maps. It should also be understood that remote sensors 19, shown in FIG. 1, may also be used to identify remote vehicles proximal to the host vehicle in addition to the vehicle speed and course of travel data transmitted in broadcast messages.

Figure 4:
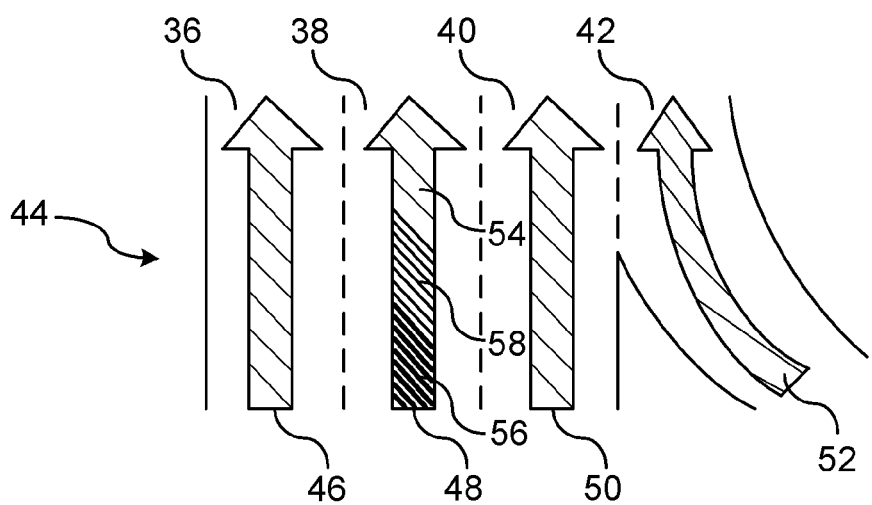
FIG. 4 is a traffic flow rate diagram.

FIG. 4 illustrates a traffic flow rate diagram 44. The traffic flow rate diagram 44 is constructed using the position and velocity vector diagram, shown in FIG. 2, and the mapping of the lanes of the roadway shown in FIG. 3. Speed data, braking data and other vehicle sensor data (e.g., airbag deployed) is used to determine the actual or predicted flow rate of traffic in each of the lanes. The flow rate speed of each of lane may be depicted to show absolute speeds, relative speeds from a speed limit, relative speed with respect to a driver's speed, or relative speed with respect to an average of nearby traffic. The traffic flow rate could also be augmented with data communicated wirelessly from infrastructure sensors (e.g., magnetic loop detectors or cameras) that can detect stopped vehicles on the roadway Arrows markers 46-52 illustrate traffic flow for each respective lane. The respective arrow markers may be color coded to identify the flow rate of traffic in the respective lane. For example, a heat map may be applied to the arrow markers to represent the flow rate of traffic. In lane 36, the arrow marker 46 is lightly cross hatched illustrating a light traffic in the lane and the flow rate of traffic is moving at a steady pace. Using a heat map, the flow rate for arrow marker 46 may be designated on an actual display device as a green colored arrow marker. In lane 38, arrow marker 48 shows denser crosshatching which represents a more heavily populated lane traveling at slower speeds. This may be designated as both a lighter crosshatched portion 54 (e.g., a green color) transitioning to a more heavily crosshatched portion 56 (e.g., a red color). A medium crosshatched portion 58 is the blend between green and red. The speed data in a respective lane may be averaged over a predetermined distances for determining the flow rate of traffic in different portions of the lane forward of the vehicle. For example, in lane 38, speed data is averaged for each respective distance forward of the vehicle (e.g., every 30 meters). As a result, the traffic flow rate within lane 38 may show different traffic flow rates over different portions within the vehicle lane. Crosshatched portion 56 shows traffic flow well below an expected speed of travel, whereas crosshatched portion 58 shows a traffic flow just below an expected speed of travel. Crosshatched portion 54 shows traffic flowing at or above an expected speed. Therefore, the driver of the vehicle can visually identify those lanes where the flow rate of the traffic is more suitable to a driver's behavior. Alternatively, the HMI may advise the driver as to which lane is more suitable to one driving behavior based on predetermined criteria. Such cues may include directional visual, auditory or haptic cues (e.g., directional vibration of the seat pan or steering wheel). It should be understood that the flow rate of speed within a respective lane may be determined by methods other than averaging, or averaging over the exemplary distances as described herein.

The determination of what is suitable to the driver's predefined behavior for advising the driver as to which lane to switch to or what speed changes to expect can be based on a number of factors including, but not limited to, travel speed to minimize delay, travel speed to maximize fuel economy, travel speed to minimize distance traveled, or travel speed to a driver's comfort (e.g., least amount of braking). Moreover, the color coding (i.e., crosshatching in the figures) may be color coded to show absolute speeds, relative speeds from a speed limit, or relative speed with respect to a driver's speed).

Figure 5:
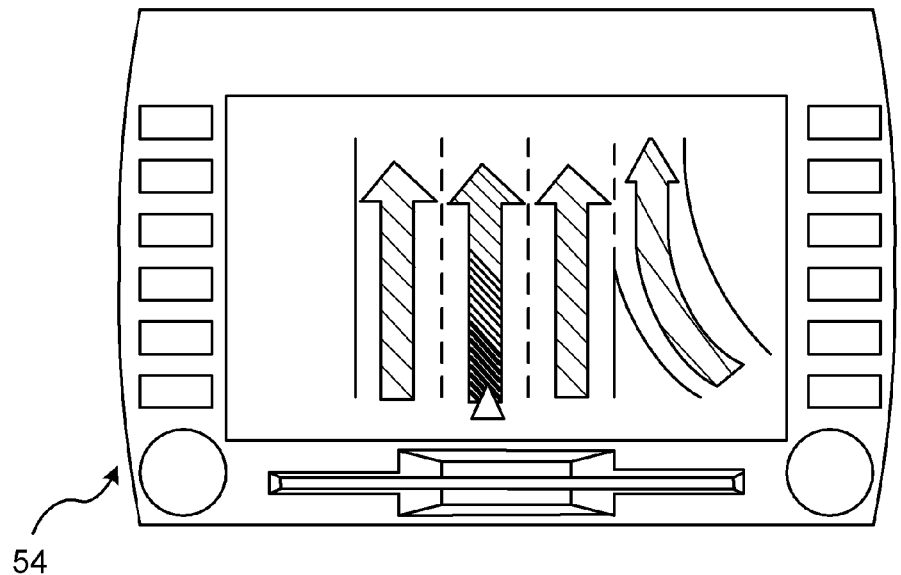
FIG. 5 is a display device according to a first embodiment of the invention.

FIG. 5 illustrates an example of a display device for indicating the traffic flow rate to the driver. The display device embodied is a navigation system 54. The navigation system 54 may include an in-vehicle navigation device or may be a portable navigation device. As described earlier, the traffic flow advisory system may be integrated into a single device or may utilize discrete devices that communicate with one another for advising the traffic flow rate to the driver of the vehicle. A portable navigation device is removable from the vehicle, but when disposed within the vehicle, the portable communication device communicates wirelessly (e.g., Bluetooth) with existing components within the vehicle for advising the traffic flow rate to the driver. For an in-vehicle device, the display device may be an in-vehicle DSRC radio that includes a display screen which may be used to display the traffic flow rates and advise the driver accordingly. Moreover, audio devices and/or haptic devices may be used in cooperation or separately to advise the driver of the traffic flow rates.

Figure 6:
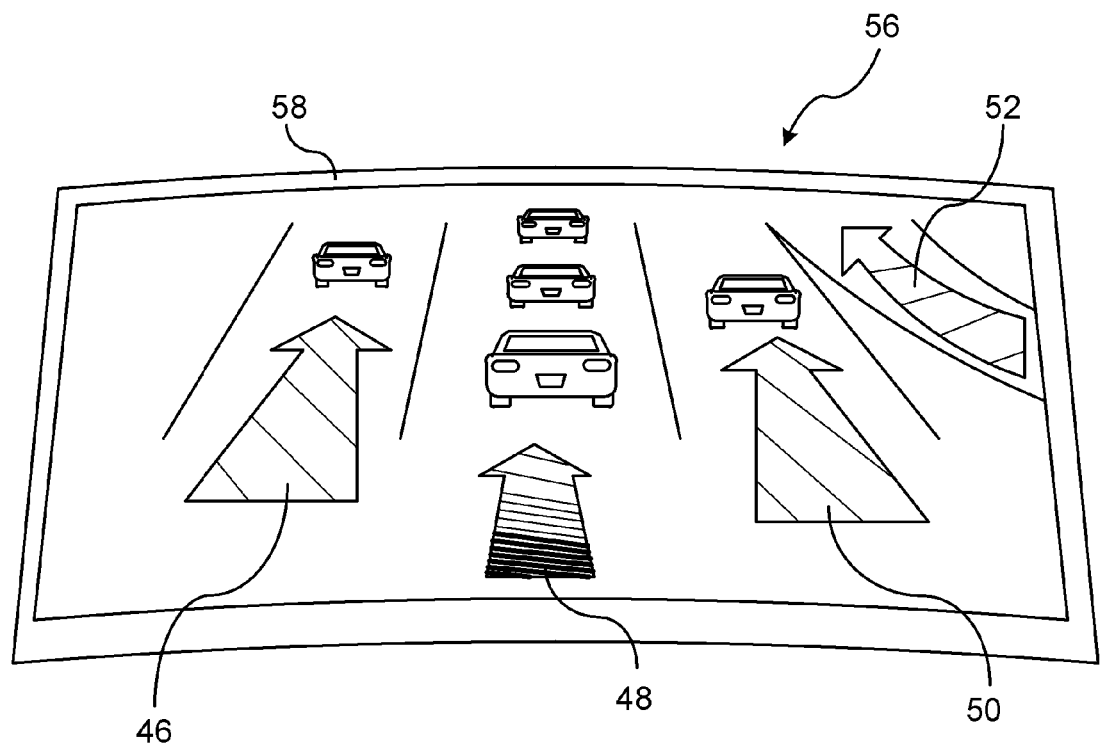
FIG. 6 is a display device according to a second embodiment of the invention.

FIG. 6 illustrates another example of a display device. The display device 56 as shown is a heads-up-display projected onto a windshield 58 of the vehicle. The projected images of the heads-up-display are translucent so as to not impair any visible exterior objects as seen through the windshield. The projected images are cooperatively blended in with those objects as seen by the driver. In FIG. 6, the vehicles, the roadway, and the lane markers of the roadway are real physical objects as seen by the driver. The arrow markers 46-52 are the images displayed on the windshield by the heads-up-display that indicate the traffic flow rate. The density of the crosshatching of each of the arrow markers 46-52 identifies the flow rate of the traffic for a respective lane. It should be understood that cross-hatching as shown herein is for illustrative purposes only and that any type of identification, such as a color in a heat map, may be used to differentiate the flow rates between the traffic lanes of the roadway as well as the flow rates within a traffic lane. As a result, the driver of the host vehicle can readily identify the desired lane of travel without having to look away from the road of travel.

Figure 7:
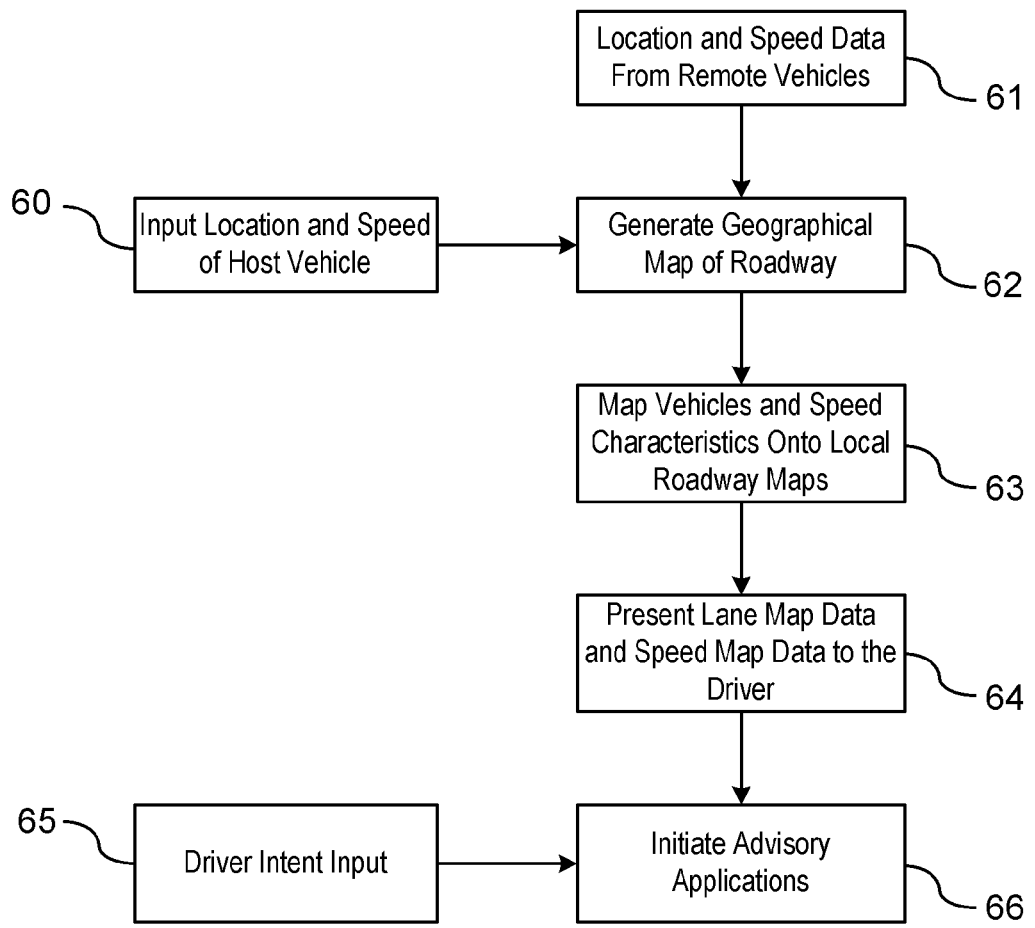
FIG. 7 is a process flow diagram for advising traffic flow rates for a roadway.

FIG. 7 illustrates a flow diagram for advising a driver as to the flow rate of traffic in the lanes of a roadway. In block 60, the global position and the speed of the host vehicle are input to a processor. Heading data may also be input if the processor is constructing a geographical lane map of the roadway.

In block 61, a global position and speed data from remote vehicles within a broadcast range of the host vehicle are broadcast to the host vehicle. Heading data may be provided if the processor is constructing a geographical lane map of the roadway.

In block 62, a map of the roadway is generated. The map may be generated based on the information supplied to the host vehicle from the remote vehicles, or may be map data of the local area retrieved from memory and information from other vehicle sensors such as radar may also be used. The map identifies the roadway and the lanes within the roadway.

In block 63, the vehicle global position and speed characteristics of the host vehicle and remote vehicles are mapped on the local roadway map. Each of the remote vehicles is mapped into their respective lanes of travel along the roadway.

In block 64, the traffic flow rate data constructed from the global position and speed characteristics of the host vehicle and remote vehicles are provided to the driver of the host vehicle by the HMI.

In block 65, any predetermined driving parameters such as driving behaviors or driving patterns that are desired by the driver of the host vehicle are input to an advisory application. The advisory application analyzes the current flow rates of each lane of the roadway in addition to the predetermined driving parameters. The predetermined parameters may be previously set up by the driver or the driver may input a current configuration based their current drive demand. The driver intent input may also include system input such as turn signals status. Advisory applications may use this input to assist the driver with speed change advisories such as in the case of changing to a slow moving lane.

In block 66, the advisory application advises the driver of the host vehicle as to which lane to select based on the current traffic flow rate of each lane and the predetermined driver parameter.

Moreover, a program may be implemented that prevents the system from updating the traffic flow in too soon of a period so as to avoid nuisance updates traffic rates are constantly changing. Under such circumstances, the program a set of logic parameters and current conditions to determine whether updates should be issued or delayed.

While certain embodiments of the present invention have been described in detail, those familiar with the art to which this invention relates will recognize various alternative designs and embodiments for practicing the invention as defined by the following claims.

What is claimed is:

1. A traffic flow advisory system comprising:
   a locating device for identifying a position of a driven vehicle;
   a communication device for exchanging vehicle position data, speed data, and heading data with remote vehicles;
   a processor for constructing a traffic flow rate in each of a plurality of lanes of a road based on the position data and speed data; and
   a human machine interface for indicating to a driver of the driven vehicle the traffic flow rate of each of the road lanes.

2. The traffic flow advisory system of claim 1 further comprising object detection sensors, the processor constructing the traffic flow rate in the plurality of road lanes utilizing the data sensed by the object detection sensors.

3. The traffic flow advisory system of claim 1 wherein the global positioning device is a navigation system.

4. The traffic flow advisory system of claim 1 wherein the communication device is a vehicle-to-vehicle communication device.

5. The traffic flow advisory system of claim 1 wherein the communication device is a vehicle-to-infrastructure communication device.

6. The traffic flow advisory system of claim 1 wherein the communication device is a cellular device.

7. The traffic flow advisory system of claim 1 wherein the human machine interface device is a visual display device.

8. The traffic flow advisory system of claim 1 wherein the human machine interface device is an audible device.

9. The traffic flow advisory system of claim 1 wherein the human machine interface device is a haptic device.

10. The traffic flow advisory system of claim 1 wherein the processor, the global positioning device, the communication device, and the human machine interface device are integrated as a single module.

11. A method for advising a driver of a host vehicle of traffic flow rates of the lanes of a traveled road, the method comprising the steps of:
    determining a position of the host vehicle;
    receiving position data, speed data, and heading data from remote vehicles in the traveled road;
    constructing a traffic flow rate for each of the plurality of road lanes of the traveled road based on the position of the host vehicle and the position data, speed data, and heading data of the remote vehicles; and
    advising the driver of the host vehicle of the traffic flow rates for each of the plurality of road lanes of the traveled road.

12. The method of claim 11 wherein a local roadway map is retrieved that identifies the local roadway, wherein the position data, speed data, and heading data is mapped onto the local roadway map for identifying respective vehicles in the lanes of the traveled road.

13. The method of claim 11 wherein position data and heading data of the host vehicle and remote vehicles are grouped for constructing the lanes of the traveled road, the grouping of respective vehicles within a localized region establishes the lanes of the traveled road.

14. The method of claim 11 wherein the traffic flow rates for each of the plurality of road lanes of the traveled road are displayed based on a speed parameter.

15. The method of claim 11 wherein a heat map is used to identify traffic flow rates in each of the respective lanes of the traveled road.

16. The method of claim 11 wherein audible communication is used to identify traffic flow rates in each of the respective lanes of the traveled road.

17. The method of claim 11 wherein object detection sensors are provided to sense remote vehicles in proximity to the host vehicle, wherein the global position data, speed data, and heading data are determined from the object detection sensors and are used to establish the traffic flow rates.

18. The method of claim 11 wherein suggestions provided to the driver of the host vehicle are based on optimizing a travel speed of the vehicle.

19. The method of claim 11 wherein suggestions provided to the driver of the host vehicle are based on optimizing a fuel economy of the vehicle.

20. The method of claim 11 wherein suggestions provided to the driver of the host vehicle are based on a host driver profile that best matches a driver's driving behavior.

* * * * *